(12) United States Patent
Adbo

(10) Patent No.: US 6,785,684 B2
(45) Date of Patent: Aug. 31, 2004

(54) APPARATUS AND METHOD FOR DETERMINING CLUSTERING FACTOR IN A DATABASE USING BLOCK LEVEL SAMPLING

(75) Inventor: Abdo Esmail Adbo, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/818,044

(22) Filed: Mar. 27, 2001

(65) Prior Publication Data

US 2002/0188601 A1 Dec. 12, 2002

(51) Int. Cl.[7] .............................................. G06F 17/30
(52) U.S. Cl. ............................ 707/101; 707/2; 707/3; 707/5; 707/6; 707/7; 707/103
(58) Field of Search ............... 707/2, 3, 6, 7, 707/101, 5, 103; 706/52; 715/513; 382/162

(56) References Cited

U.S. PATENT DOCUMENTS

| | | | | |
|---|---|---|---|---|
| 5,926,812 A | * | 7/1999 | Hilsenrath et al. | 707/5 |
| 6,049,797 A | * | 4/2000 | Guha et al. | 707/6 |
| 6,233,571 B1 | * | 5/2001 | Egger et al. | 707/2 |
| 6,347,313 B1 | * | 2/2002 | Ma et al. | 707/3 |
| 6,374,251 B1 | * | 4/2002 | Fayyad et al. | 707/101 |
| 6,389,436 B1 | * | 5/2002 | Chakrabarti et al. | 715/513 |
| 6,519,591 B1 | * | 2/2003 | Cereghini et al. | 707/6 |
| 6,529,891 B1 | * | 3/2003 | Heckerman | 706/52 |
| 6,591,007 B1 | * | 7/2003 | Petkovic et al. | 382/162 |
| 6,633,882 B1 | * | 10/2003 | Fayyad et al. | 707/101 |
| 6,654,743 B1 | * | 11/2003 | Hogg et al. | 707/7 |
| 6,728,728 B2 | * | 4/2004 | Spiegler et al. | 707/103 R |

OTHER PUBLICATIONS

Fahy, "Computer systems and methods for hierarchical cluster analysis of large sets of biological data including highly dense gene array data", US Patent Application Publication, May 2002, pp. 1–21.*

* cited by examiner

*Primary Examiner*—Thuy N. Pardo
(74) *Attorney, Agent, or Firm*—Martin & Associates, LLC; Derek P. Martin

(57) ABSTRACT

An apparatus and method perform block-level sampling on a database, process the data to generate one or more matrices, and process the one or more matrices to generate a clustering factor for a selected index. In addition, the apparatus and method of the preferred embodiments allow the distribution of the clustering factor to be determined across a range, thereby allowing the identification of ranges where the clustering factor is high and ranges where the clustering factor is low. The clustering factor distribution can then be used to predict the memory paging performance of a search that uses an existing or a potential index that corresponds to the sampled data, and can therefore be used to predict the performance of searching the database using an existing or potential index for a particular database query.

28 Claims, 12 Drawing Sheets

210 — Page Fetch I/Os = f(LRU Buffer Size)
220 — Clustering Ratio = f(Page Fetch I/Os)

| P1 | | | P2 | | | P3 | | P4 | | | P5 | | |
|---|---|---|---|---|---|---|---|---|---|---|---|---|---|
| K5 | K1 | K10 | K7 | K8 | K2 | K4 | K11 | K12 | K9 | | K13 | K6 | K3 |

FIG. 5

| K1 | P1 |
|---|---|
| K2 | P2 |
| K3 | P5 |
| K4 | P3 |
| K5 | P1 |
| K6 | P5 |
| K7 | P2 |
| K8 | P2 |
| K9 | P4 |
| K10 | P1 |
| K11 | P3 |
| K12 | P4 |
| K13 | P5 |

|    | K1 | K2 | K3 | K4 | K5 | K6 | K7 | K8 | K9 | K10 | K11 | K12 | K13 |
|----|----|----|----|----|----|----|----|----|----|-----|-----|-----|-----|
| P1 | 1  | 0  | 0  | 0  | 0  | 0  | 0  | 0  | 0  | 0   | 0   | 0   | 0   |
| P2 | 0  | 0  | 0  | 0  | 0  | 0  | 0  | 0  | 0  | 0   | 0   | 0   | 0   |
| P3 | 0  | 0  | 0  | 0  | 0  | 0  | 0  | 0  | 0  | 0   | 0   | 0   | 0   |
| P4 | 0  | 0  | 0  | 0  | 0  | 0  | 0  | 0  | 0  | 0   | 0   | 0   | 0   |
| P5 | 0  | 0  | 0  | 0  | 0  | 0  | 0  | 0  | 0  | 0   | 0   | 0   | 0   |

FIG. 7

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| K1  | 1  | 0  | 0  | 0  | 0  | 0  | 0  | 0  | 0  | 0   | 0   | 0   | 0   |
| K2  | 0  | 0  | 0  | 0  | 0  | 0  | 0  | 0  | 0  | 0   | 0   | 0   | 0   |
| K3  | 0  | 0  | 0  | 0  | 0  | 0  | 0  | 0  | 0  | 0   | 0   | 0   | 0   |
| K4  | 0  | 0  | 0  | 0  | 0  | 0  | 0  | 0  | 0  | 0   | 0   | 0   | 0   |
| K5  | 0  | 0  | 0  | 0  | 0  | 0  | 0  | 0  | 0  | 0   | 0   | 0   | 0   |
| K6  | 0  | 0  | 0  | 0  | 0  | 0  | 0  | 0  | 0  | 0   | 0   | 0   | 0   |
| K7  | 0  | 0  | 0  | 0  | 0  | 0  | 0  | 0  | 0  | 0   | 0   | 0   | 0   |
| K8  | 0  | 0  | 0  | 0  | 0  | 0  | 0  | 0  | 0  | 0   | 0   | 0   | 0   |
| K9  | 0  | 0  | 0  | 0  | 0  | 0  | 0  | 0  | 0  | 0   | 0   | 0   | 0   |
| K10 | 0  | 0  | 0  | 0  | 0  | 0  | 0  | 0  | 0  | 0   | 0   | 0   | 0   |
| K11 | 0  | 0  | 0  | 0  | 0  | 0  | 0  | 0  | 0  | 0   | 0   | 0   | 0   |
| K12 | 0  | 0  | 0  | 0  | 0  | 0  | 0  | 0  | 0  | 0   | 0   | 0   | 0   |
| K13 | 0  | 0  | 0  | 0  | 0  | 0  | 0  | 0  | 0  | 0   | 0   | 0   | 0   |

FIG. 8

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| P1  | 1  | 0  | 0  | 0  | 0  | 0  | 0  | 0  | 0  | 0   | 0   | 0   | 0   |
| → P2 | 01 | 01 | 0  | 0  | 0  | 0  | 0  | 0  | 0  | 0   | 0   | 0   | 0   |
| P3  | 0  | 0  | 0  | 0  | 0  | 0  | 0  | 0  | 0  | 0   | 0   | 0   | 0   |
| P4  | 0  | 0  | 0  | 0  | 0  | 0  | 0  | 0  | 0  | 0   | 0   | 0   | 0   |
| P5  | 0  | 0  | 0  | 0  | 0  | 0  | 0  | 0  | 0  | 0   | 0   | 0   | 0   |

FIG. 9

|      | K1 | K2 | K3 | K4 | K5 | K6 | K7 | K8 | K9 | K10 | K11 | K12 | K13 |
|------|----|----|----|----|----|----|----|----|----|-----|-----|-----|-----|
| K1   | 1  | 0  | 0  | 0  | 0  | 0  | 0  | 0  | 0  | 0   | 0   | 0   | 0   |
| → K2 | 2  | 1  | 0  | 0  | 0  | 0  | 0  | 0  | 0  | 0   | 0   | 0   | 0   |
| K3   | 0  | 0  | 0  | 0  | 0  | 0  | 0  | 0  | 0  | 0   | 0   | 0   | 0   |
| K4   | 0  | 0  | 0  | 0  | 0  | 0  | 0  | 0  | 0  | 0   | 0   | 0   | 0   |
| K5   | 0  | 0  | 0  | 0  | 0  | 0  | 0  | 0  | 0  | 0   | 0   | 0   | 0   |
| K6   | 0  | 0  | 0  | 0  | 0  | 0  | 0  | 0  | 0  | 0   | 0   | 0   | 0   |
| K7   | 0  | 0  | 0  | 0  | 0  | 0  | 0  | 0  | 0  | 0   | 0   | 0   | 0   |
| K8   | 0  | 0  | 0  | 0  | 0  | 0  | 0  | 0  | 0  | 0   | 0   | 0   | 0   |
| K9   | 0  | 0  | 0  | 0  | 0  | 0  | 0  | 0  | 0  | 0   | 0   | 0   | 0   |
| K10  | 0  | 0  | 0  | 0  | 0  | 0  | 0  | 0  | 0  | 0   | 0   | 0   | 0   |
| K11  | 0  | 0  | 0  | 0  | 0  | 0  | 0  | 0  | 0  | 0   | 0   | 0   | 0   |
| K12  | 0  | 0  | 0  | 0  | 0  | 0  | 0  | 0  | 0  | 0   | 0   | 0   | 0   |
| K13  | 0  | 0  | 0  | 0  | 0  | 0  | 0  | 0  | 0  | 0   | 0   | 0   | 0   |

FIG. 10

|    | K1 | K2 | K3 | K4 | K5 | K6 | K7 | K8 | K9 | K10 | K11 | K12 | K13 |
|----|----|----|----|----|----|----|----|----|----|-----|-----|-----|-----|
| P1 | 1  | 0  | 0  | 0  | 0  | 0  | 0  | 0  | 0  | 0   | 0   | 0   | 0   |
| P2 | ∅1 | ∅1 | 0  | 0  | 0  | 0  | 0  | 0  | 0  | 0   | 0   | 0   | 0   |
| P3 | 0  | 0  | 0  | 0  | 0  | 0  | 0  | 0  | 0  | 0   | 0   | 0   | 0   |
| P4 | 0  | 0  | 0  | 0  | 0  | 0  | 0  | 0  | 0  | 0   | 0   | 0   | 0   |
| → P5 | ∅1 | ∅1 | ∅1 | 0 | 0 | 0 | 0 | 0 | 0 | 0 | 0 | 0 | 0 |

FIG. 11

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| K1  | 1  | 0  | 0  | 0  | 0  | 0  | 0  | 0  | 0  | 0   | 0   | 0   | 0   |
| K2  | 2  | 1  | 0  | 0  | 0  | 0  | 0  | 0  | 0  | 0   | 0   | 0   | 0   |
| → K3 | 3 | 2 | 1 | 0 | 0 | 0 | 0 | 0 | 0 | 0 | 0 | 0 | 0 |
| K4  | 0  | 0  | 0  | 0  | 0  | 0  | 0  | 0  | 0  | 0   | 0   | 0   | 0   |
| K5  | 0  | 0  | 0  | 0  | 0  | 0  | 0  | 0  | 0  | 0   | 0   | 0   | 0   |
| K6  | 0  | 0  | 0  | 0  | 0  | 0  | 0  | 0  | 0  | 0   | 0   | 0   | 0   |
| K7  | 0  | 0  | 0  | 0  | 0  | 0  | 0  | 0  | 0  | 0   | 0   | 0   | 0   |
| K8  | 0  | 0  | 0  | 0  | 0  | 0  | 0  | 0  | 0  | 0   | 0   | 0   | 0   |
| K9  | 0  | 0  | 0  | 0  | 0  | 0  | 0  | 0  | 0  | 0   | 0   | 0   | 0   |
| K10 | 0  | 0  | 0  | 0  | 0  | 0  | 0  | 0  | 0  | 0   | 0   | 0   | 0   |
| K11 | 0  | 0  | 0  | 0  | 0  | 0  | 0  | 0  | 0  | 0   | 0   | 0   | 0   |
| K12 | 0  | 0  | 0  | 0  | 0  | 0  | 0  | 0  | 0  | 0   | 0   | 0   | 0   |
| K13 | 0  | 0  | 0  | 0  | 0  | 0  | 0  | 0  | 0  | 0   | 0   | 0   | 0   |

FIG. 12

|    | K1 | K2 | K3 | K4 | K5 | K6 | K7 | K8 | K9 | K10 | K11 | K12 | K13 |
|----|----|----|----|----|----|----|----|----|----|-----|-----|-----|-----|
| P1 | 1  | 0  | 0  | 0  | 0  | 0  | 0  | 0  | 0  | 0   | 0   | 0   | 0   |
| P2 | ∅1 | ∅1 | 0  | 0  | 0  | 0  | 0  | 0  | 0  | 0   | 0   | 0   | 0   |
| P3 | ∅1 | ∅1 | ∅1 | ∅1 | 0  | 0  | 0  | 0  | 0  | 0   | 0   | 0   | 0   |
| P4 | 0  | 0  | 0  | 0  | 0  | 0  | 0  | 0  | 0  | 0   | 0   | 0   | 0   |
| P5 | ∅1 | ∅1 | ∅1 | 0  | 0  | 0  | 0  | 0  | 0  | 0   | 0   | 0   | 0   |

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| K1  | 1  | 0  | 0  | 0  | 0  | 0  | 0  | 0  | 0  | 0   | 0   | 0   | 0   |
| K2  | 2  | 1  | 0  | 0  | 0  | 0  | 0  | 0  | 0  | 0   | 0   | 0   | 0   |
| K3  | 3  | 2  | 1  | 0  | 0  | 0  | 0  | 0  | 0  | 0   | 0   | 0   | 0   |
| K4  | 4  | 3  | 2  | 1  | 0  | 0  | 0  | 0  | 0  | 0   | 0   | 0   | 0   |
| K5  | 0  | 0  | 0  | 0  | 0  | 0  | 0  | 0  | 0  | 0   | 0   | 0   | 0   |
| K6  | 0  | 0  | 0  | 0  | 0  | 0  | 0  | 0  | 0  | 0   | 0   | 0   | 0   |
| K7  | 0  | 0  | 0  | 0  | 0  | 0  | 0  | 0  | 0  | 0   | 0   | 0   | 0   |
| K8  | 0  | 0  | 0  | 0  | 0  | 0  | 0  | 0  | 0  | 0   | 0   | 0   | 0   |
| K9  | 0  | 0  | 0  | 0  | 0  | 0  | 0  | 0  | 0  | 0   | 0   | 0   | 0   |
| K10 | 0  | 0  | 0  | 0  | 0  | 0  | 0  | 0  | 0  | 0   | 0   | 0   | 0   |
| K11 | 0  | 0  | 0  | 0  | 0  | 0  | 0  | 0  | 0  | 0   | 0   | 0   | 0   |
| K12 | 0  | 0  | 0  | 0  | 0  | 0  | 0  | 0  | 0  | 0   | 0   | 0   | 0   |
| K13 | 0  | 0  | 0  | 0  | 0  | 0  | 0  | 0  | 0  | 0   | 0   | 0   | 0   |

|     | K1 | K2 | K3 | K4 | K5 | K6 | K7 | K8 | K9 | K10 | K11 | K12 | K13 |
|-----|----|----|----|----|----|----|----|----|----|----|----|----|----|
| P1  | 1  | ∅1 | ∅1 | ∅1 | ∅1 | 0  | 0  | 0  | 0  | 0  | 0  | 0  | 0  |
| P2  | ∅1 | ∅1 | 0  | 0  | 0  | 0  | 0  | 0  | 0  | 0  | 0  | 0  | 0  |
| P3  | ∅1 | ∅1 | ∅1 | ∅1 | 0  | 0  | 0  | 0  | 0  | 0  | 0  | 0  | 0  |
| P4  | 0  | 0  | 0  | 0  | 0  | 0  | 0  | 0  | 0  | 0  | 0  | 0  | 0  |
| P5  | ∅1 | ∅1 | ∅1 | 0  | 0  | 0  | 0  | 0  | 0  | 0  | 0  | 0  | 0  |

FIG. 15

|     | K1 | K2 | K3 | K4 | K5 | K6 | K7 | K8 | K9 | K10 | K11 | K12 | K13 |
|-----|----|----|----|----|----|----|----|----|----|----|----|----|----|
| K1  | 1  | 0  | 0  | 0  | 0  | 0  | 0  | 0  | 0  | 0  | 0  | 0  | 0  |
| K2  | 2  | 1  | 0  | 0  | 0  | 0  | 0  | 0  | 0  | 0  | 0  | 0  | 0  |
| K3  | 3  | 2  | 1  | 0  | 0  | 0  | 0  | 0  | 0  | 0  | 0  | 0  | 0  |
| K4  | 4  | 3  | 2  | 1  | 0  | 0  | 0  | 0  | 0  | 0  | 0  | 0  | 0  |
| K5  | 4  | 4  | 3  | 2  | 1  | 0  | 0  | 0  | 0  | 0  | 0  | 0  | 0  |
| K6  | 0  | 0  | 0  | 0  | 0  | 0  | 0  | 0  | 0  | 0  | 0  | 0  | 0  |
| K7  | 0  | 0  | 0  | 0  | 0  | 0  | 0  | 0  | 0  | 0  | 0  | 0  | 0  |
| K8  | 0  | 0  | 0  | 0  | 0  | 0  | 0  | 0  | 0  | 0  | 0  | 0  | 0  |
| K9  | 0  | 0  | 0  | 0  | 0  | 0  | 0  | 0  | 0  | 0  | 0  | 0  | 0  |
| K10 | 0  | 0  | 0  | 0  | 0  | 0  | 0  | 0  | 0  | 0  | 0  | 0  | 0  |
| K11 | 0  | 0  | 0  | 0  | 0  | 0  | 0  | 0  | 0  | 0  | 0  | 0  | 0  |
| K12 | 0  | 0  | 0  | 0  | 0  | 0  | 0  | 0  | 0  | 0  | 0  | 0  | 0  |
| K13 | 0  | 0  | 0  | 0  | 0  | 0  | 0  | 0  | 0  | 0  | 0  | 0  | 0  |

FIG. 16

|    | K1 | K2 | K3 | K4 | K5 | K6 | K7 | K8 | K9 | K10 | K11 | K12 | K13 |
|----|----|----|----|----|----|----|----|----|----|-----|-----|-----|-----|
| P1 | 1  | ∅1 | ∅1 | ∅1 | ∅1 | 0  | 0  | 0  | 0  | 0   | 0   | 0   | 0   |
| P2 | ∅1 | ∅1 | 0  | 0  | 0  | 0  | 0  | 0  | 0  | 0   | 0   | 0   | 0   |
| P3 | ∅1 | ∅1 | ∅1 | ∅1 | 0  | 0  | 0  | 0  | 0  | 0   | 0   | 0   | 0   |
| P4 | 0  | 0  | 0  | 0  | 0  | 0  | 0  | 0  | 0  | 0   | 0   | 0   | 0   |
| → P5 | ∅1 | ∅1 | ∅1 | ∅1 | ∅1 | ∅1 | 0 | 0 | 0 | 0 | 0 | 0 | 0 |

FIG. 17

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| K1  | 1  | 0  | 0  | 0  | 0  | 0  | 0  | 0  | 0  | 0   | 0   | 0   | 0   |
| K2  | 2  | 1  | 0  | 0  | 0  | 0  | 0  | 0  | 0  | 0   | 0   | 0   | 0   |
| K3  | 3  | 2  | 1  | 0  | 0  | 0  | 0  | 0  | 0  | 0   | 0   | 0   | 0   |
| K4  | 4  | 3  | 2  | 1  | 0  | 0  | 0  | 0  | 0  | 0   | 0   | 0   | 0   |
| K5  | 4  | 4  | 3  | 2  | 1  | 0  | 0  | 0  | 0  | 0   | 0   | 0   | 0   |
| → K6 | 4  | 4  | 3  | 3  | 2  | 1  | 0  | 0  | 0  | 0   | 0   | 0   | 0   |
| K7  | 0  | 0  | 0  | 0  | 0  | 0  | 0  | 0  | 0  | 0   | 0   | 0   | 0   |
| K8  | 0  | 0  | 0  | 0  | 0  | 0  | 0  | 0  | 0  | 0   | 0   | 0   | 0   |
| K9  | 0  | 0  | 0  | 0  | 0  | 0  | 0  | 0  | 0  | 0   | 0   | 0   | 0   |
| K10 | 0  | 0  | 0  | 0  | 0  | 0  | 0  | 0  | 0  | 0   | 0   | 0   | 0   |
| K11 | 0  | 0  | 0  | 0  | 0  | 0  | 0  | 0  | 0  | 0   | 0   | 0   | 0   |
| K12 | 0  | 0  | 0  | 0  | 0  | 0  | 0  | 0  | 0  | 0   | 0   | 0   | 0   |
| K13 | 0  | 0  | 0  | 0  | 0  | 0  | 0  | 0  | 0  | 0   | 0   | 0   | 0   |

FIG. 18

|    | K1 | K2 | K3 | K4 | K5 | K6 | K7 | K8 | K9 | K10 | K11 | K12 | K13 |
|----|----|----|----|----|----|----|----|----|----|-----|-----|-----|-----|
| P1 | Ø1 | Ø1 | Ø1 | Ø1 | Ø1 | Ø1 | Ø1 | Ø1 | Ø1 | Ø1  | 0   | 0   | 0   |
| P2 | Ø1 | Ø1 | Ø1 | Ø1 | Ø1 | Ø1 | Ø1 | Ø1 | 0  | 0   | 0   | 0   | 0   |
| P3 | Ø1 | Ø1 | Ø1 | Ø1 | Ø1 | Ø1 | Ø1 | Ø1 | Ø1 | Ø1  | 0   | 0   | 0   |
| P4 | Ø1 | Ø1 | Ø1 | Ø1 | Ø1 | Ø1 | Ø1 | Ø1 | Ø1 | Ø1  | Ø1  | Ø1  | 0   |
| P5 | Ø1 | Ø1 | Ø1 | Ø1 | Ø1 | Ø1 | Ø1 | Ø1 | Ø1 | Ø1  | Ø1  | Ø1  | Ø1  |

FIG. 19

|     | K1 | K2 | K3 | K4 | K5 | K6 | K7 | K8 | K9 | K10 | K11 | K12 | K13 |
|-----|----|----|----|----|----|----|----|----|----|-----|-----|-----|-----|
| K1  | 1  | 0  | 0  | 0  | 0  | 0  | 0  | 0  | 0  | 0   | 0   | 0   | 0   |
| K2  | 2  | 1  | 0  | 0  | 0  | 0  | 0  | 0  | 0  | 0   | 0   | 0   | 0   |
| K3  | 3  | 2  | 1  | 0  | 0  | 0  | 0  | 0  | 0  | 0   | 0   | 0   | 0   |
| K4  | 4  | 3  | 2  | 1  | 0  | 0  | 0  | 0  | 0  | 0   | 0   | 0   | 0   |
| K5  | 4  | 4  | 3  | 2  | 1  | 0  | 0  | 0  | 0  | 0   | 0   | 0   | 0   |
| K6  | 4  | 4  | 3  | 3  | 2  | 1  | 0  | 0  | 0  | 0   | 0   | 0   | 0   |
| K7  | 4  | 4  | 4  | 4  | 3  | 2  | 1  | 0  | 0  | 0   | 0   | 0   | 0   |
| K8  | 4  | 4  | 4  | 4  | 3  | 2  | 1  | 1  | 0  | 0   | 0   | 0   | 0   |
| K9  | 5  | 5  | 5  | 5  | 4  | 3  | 2  | 2  | 1  | 0   | 0   | 0   | 0   |
| K10 | 5  | 5  | 5  | 5  | 4  | 4  | 3  | 3  | 2  | 1   | 0   | 0   | 0   |
| K11 | 5  | 5  | 5  | 5  | 5  | 5  | 4  | 3  | 3  | 2   | 1   | 0   | 0   |
| K12 | 5  | 5  | 5  | 5  | 5  | 5  | 4  | 4  | 3  | 3   | 2   | 1   | 0   |
| K13 | 5  | 5  | 5  | 5  | 5  | 5  | 5  | 4  | 4  | 3   | 2   | 1   | 1   |

FIG. 20

APPARATUS AND METHOD FOR DETERMINING CLUSTERING FACTOR IN A DATABASE USING BLOCK LEVEL SAMPLING

BACKGROUND OF THE INVENTION

1. Technical Field

This invention generally relates to computer systems and more specifically relates to databases in computer systems.

2. Background Art

Since the dawn of the computer age, computers have evolved and become more and more powerful. In our present day, computers have become indispensable in many fields of human endeavor including engineering design, machine and process control, and information storage and access. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Databases generally contain one or more indexes that make searching the database for information much more efficient than performing a full database search for every query. The performance of a database system is dependent on the performance of a paged memory system that swaps pages from disk to a buffer. If the order of keys in a particular index is close to the physical order of the keys in the database table, the performance of the memory paging system using this index will be improved because many accesses will likely be made to the page buffer without performing page swaps. A statistical measure of the correlation of a column in the database to the corresponding data in physical storage is known as "clustering factor". The clustering factor indicates the degree to which the data in the physical storage is clustered (i.e., close together) in physical storage.

Clustering factor in the prior art is typically computed as a function of the size of a memory page and the size of the page buffer. Making this computation is relatively straightforward when the size of the page buffer is known. The size of a page buffer is generally known for virtual memory systems that specify a virtual size for the buffer. However, some computer platforms, such as the IBM iSeries 400, do not have a virtual memory system that provides a fixed-sized page buffer, but instead have a single-level store. With a single-level store, the address space of the processor must be shared among the operating system and all applications. For this reason, it is impossible to set a fixed size for the page buffer, because the size can vary and even change dynamically as system requirements change. Without an apparatus and method for determining clustering factor in a database that has a variable-sized page buffer, the clustering factor for indexes will be unavailable for some types of computer platforms, making it difficult to optimize database performance based on clustering factor.

DISCLOSURE OF INVENTION

According to the preferred embodiments, an apparatus and method perform block-level sampling on a database, process the data to generate one or more matrices, and process the one or more matrices to generate a clustering factor for a selected index. In addition, the apparatus and method of the preferred embodiments allow the distribution of the clustering factor to be determined across a range, thereby allowing the identification of ranges where the clustering factor is high and ranges where the clustering factor is low. The clustering factor distribution can then be used to predict the memory paging performance of a search that uses an existing or a potential index that corresponds to the sampled data, and can therefore be used to predict the performance of searching the database using an existing or potential index for a particular database query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a block diagram that shows five pages that are block sampled at random from a database;

FIG. 6 is a block diagram of a sorted list of the key values and their corresponding page numbers for the pages shown in FIG. 5;

FIG. 7 is a block diagram of a bitmap in accordance with the preferred embodiments that has been initialized;

FIG. 8 is a block diagram of a triangular matrix in accordance with the preferred embodiments that has been initialized;

FIG. 9 is a block diagram of the bitmap of FIG. 7 after processing the first index key K1 in accordance with the preferred embodiments;

FIG. 10 is a block diagram of the triangular matrix of FIG. 8 after processing the first index key K1 in accordance with the preferred embodiments;

FIG. 11 is a block diagram of the bitmap of FIG. 7 after processing the second index key K2 in accordance with the preferred embodiments;

FIG. 12 is a block diagram of the triangular matrix of FIG. 8 after processing the second index key K2 in accordance with the preferred embodiments;

FIG. 13 is a block diagram of the bitmap of FIG. 7 after processing the third index key K3 in accordance with the preferred embodiments;

FIG. 14 is a block diagram of the triangular matrix of FIG. 8 after processing the third index key K3 in accordance with the preferred embodiments;

FIG. 15 is a block diagram of the bitmap of FIG. 7 after processing the fourth index key K4 in accordance with the preferred embodiments;

FIG. 16 is a block diagram of the triangular matrix of FIG. 8 after processing the fourth index key K4 in accordance with the preferred embodiments;

FIG. 17 is a block diagram of the bitmap of FIG. 7 after processing the fifth index key K5 in accordance with the preferred embodiments;

FIG. 18 is a block diagram of the triangular matrix of FIG. 8 after processing the fifth index key K5 in accordance with the preferred embodiments;

FIG. 19 is a block diagram of the bitmap of FIG. 7 after processing all of the index keys K1–K13 in accordance with the preferred embodiments;

FIG. 20 is a block diagram of the triangular matrix of FIG. 8 after processing all of the index keys K1–K13 in accordance with the preferred embodiments.

BEST MODE FOR CARRYING OUT THE INVENTION

Overview

The apparatus and method of the present invention relates to the determination of clustering factor in a database. For those individuals who are not familiar with databases and clustering factors in a database, a brief overview of relevant concepts is presented below.

Databases

Figures 1, 2:
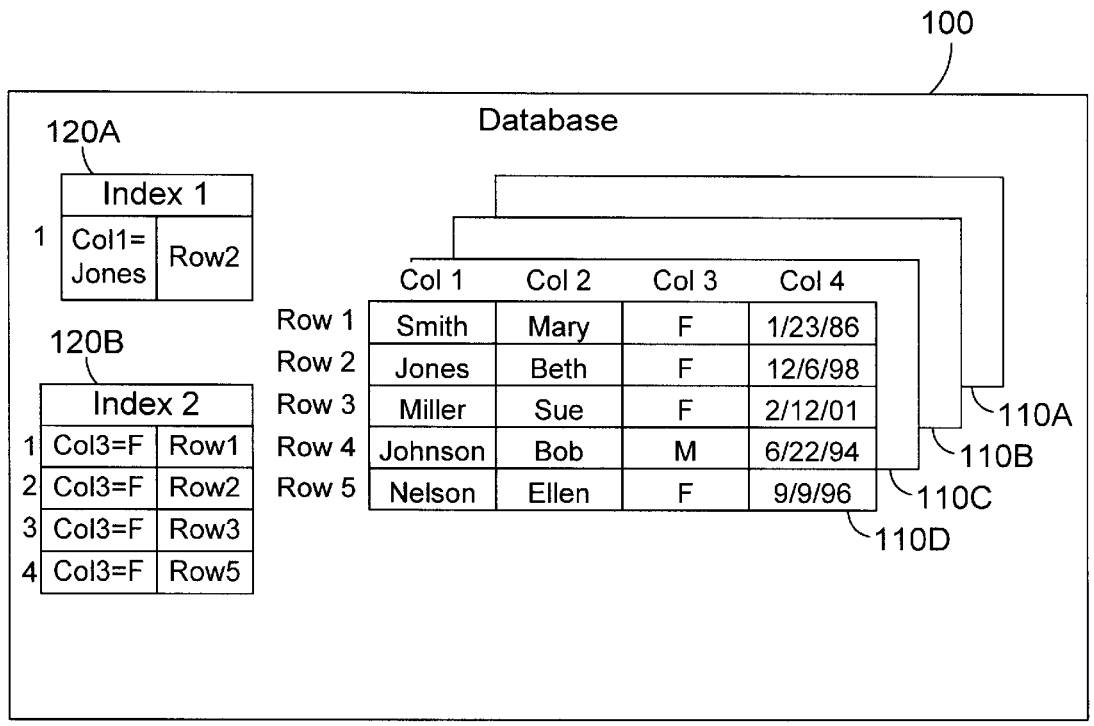
FIG. 1 is a block diagram of a prior art database.
FIG. 2 shows how clustering factor of a database index is computed in the prior art.

Many different types of databases are in use today. The most common are relational databases (RDBs), which are also called legacy databases in the art. Referring to FIG. 1, most databases include one or more tables 110 that are organized as a collection of rows and columns. Each column (or field) typically specifies the type of data to be stored, and each row typically represents a different entry (or record) in the database. Thus, for table 110D in FIG. 1, let's assume that Col 1 contains an employee's last name, Col 2 contains the employee's first name, Col 3 contains the employee's gender, and Col 4 contains the employee's date of hire. Row 1 would then represent an entry (record) for a particular employee, Mary Smith for the example in FIG. 1. In addition, row 2 contains a record for Beth Jones; row 3 contains a record for Sue Miller; row 4 contains a record for Bob Johnson; and row 5 contains a record for Ellen Nelson. The genders and respective hire dates for these employees are shown in Col 3 and Col 4, respectively, of each record.

The sample database table 110D in FIG. 1 is very small to illustrate the concept of database tables. It is clear that in many applications, database tables may contain a large number of columns, and may contain a very large number of rows. For example, a database of employees for IBM Corporation could have a table that has many columns and that has tens of thousands of rows. With so much data in a database table, performing a full table search can become very time-consuming. As a result, indexes were developed to speed database searches by categorizing the data in the database according to key values in the index. Referring to FIG. 1, two indexes 120A and 120B are shown, and are referred to hereafter as Index 1 and Index 2, respectively. An index includes a key that specifies a criteria, known in the art as a "predicate", for locating information in the table, and values that specify rows in the database that satisfy the predicate. We assume for this example that the predicate for Index 1 is that the last name of an employee is "Jones". Row 2 contains the record for the employee with a last name of Jones, so Row 2 appears in the index next to the key to indicate the record that satisfies the key. Note that many records may satisfy a key, as shown for Index 2 of FIG. 1.

We assume that Index 2 has a key with a predicate that specifies that an employee's gender is female. Rows 1, 2, 3 and 5 satisfy this predicate, so Index 2 contains entries for each of these rows. A measure of how completely the index represents the data in the database table is known in the art as "selectivity". If an index has low selectivity, the index represents relatively few records in the database table. If an index has high selectivity, the index represents a relatively large number of records in the database table. Index 1 in FIG. 1 references only one of the five records in the database table 110D, and therefore has a selectivity of 20%, which would be a relatively low selectivity for the example in FIG. 1. Index 2, in contrast, references four of the five records in the database table 110D, for a selectivity of 80%, which would be a relatively high selectivity for the example in FIG. 1. The selectivity is a measure for how many records in the underlying table are represented in the index. If an index has high selectivity, its use for searching the database is limited because a full table search may be nearly as fast as an index search using the index. An index that has low selectivity may significantly improve performance of searching the database because only a small proportion of the database records are represented in the index. In the prior art, if the selectivity of an index exceeds some threshold value, a full table search will generally be performed instead of using an index.

Clustering Factor

In a database, the term "clustering" is used to indicate when data is grouped together in physical storage. The terms "clustering ratio" or "clustering factor" have been used in the art to represent the degree to which an index is sorted with respect to the physical order of data represented in the index. Clustering factor is an important measure to estimate the performance of a memory paging system that fetches pages from disk to memory and performs swaps of pages from disk to memory and from memory to disk. A low clustering factor leads to more page swaps for an index scan, because after the first access of data in an index, it is less likely that the page containing the data will still be in the page buffer the next time the page is accessed.

Most modern databases support the computation of clustering factor to tune the database and thereby optimize its performance. Clustering factors can be used to compare the relative efficiency in indexes in a database, and to predict the efficiency of a potential index. In many known databases, a data manager has access to information, such as page buffer size, that helps fetch index pages efficiently. In traditional databases, the database manager knows in advance the size of the page buffer before running a query. Referring to FIG. 2, the database manager determines page fetch I/Os that are required to scan a particular index or column in the database as a function of the page buffer size, as shown in line 210 of FIG. 2. The clustering factor can then be computed as a function of the page fetch I/Os, as shown in line 220 of FIG. 2. The computation of clustering factor as shown in FIG. 2 is possible for computer systems that have a virtual memory system, and therefore have a page buffer of a known size. However, some computer systems do not have a virtual memory system that can provide a fixed-size page buffer. For example, the IBM iSeries 400 computer system uses a "single-level store" rather than a two-level store that supports virtual memory. The database DB2/400 is a very popular database that is commonly run on the iSeries 400 computer platform. However, due to the single-level store of the iSeries 400, clustering factor for an index cannot be computed as shown in FIG. 2, because there is no local (i.e., virtual) dedicated page buffer for the database. The size of the page buffer can vary according to system load, so there is no way to directly compute the clustering factor using page buffer size. The preferred embodiments described below provide a way that can be used to determine clustering factor for a database index in computer systems that have a single-level store as well as in systems that have a two-level store.

DETAILED DESCRIPTION

The present invention provides a way of determining the clustering factor for a range in the database using techniques that do not depend on a knowledge of page buffer size. Block level sampling is performed in many databases today to compute statistics regarding the performance of the database. The preferred embodiments herein use information from the block level sampling already being performed to determine clustering factor for an index. In addition, the preferred embodiments allow computation of clustering factor over a particular range, allowing the distribution of the clustering factor to be determined over any specified range.

Figure 3:
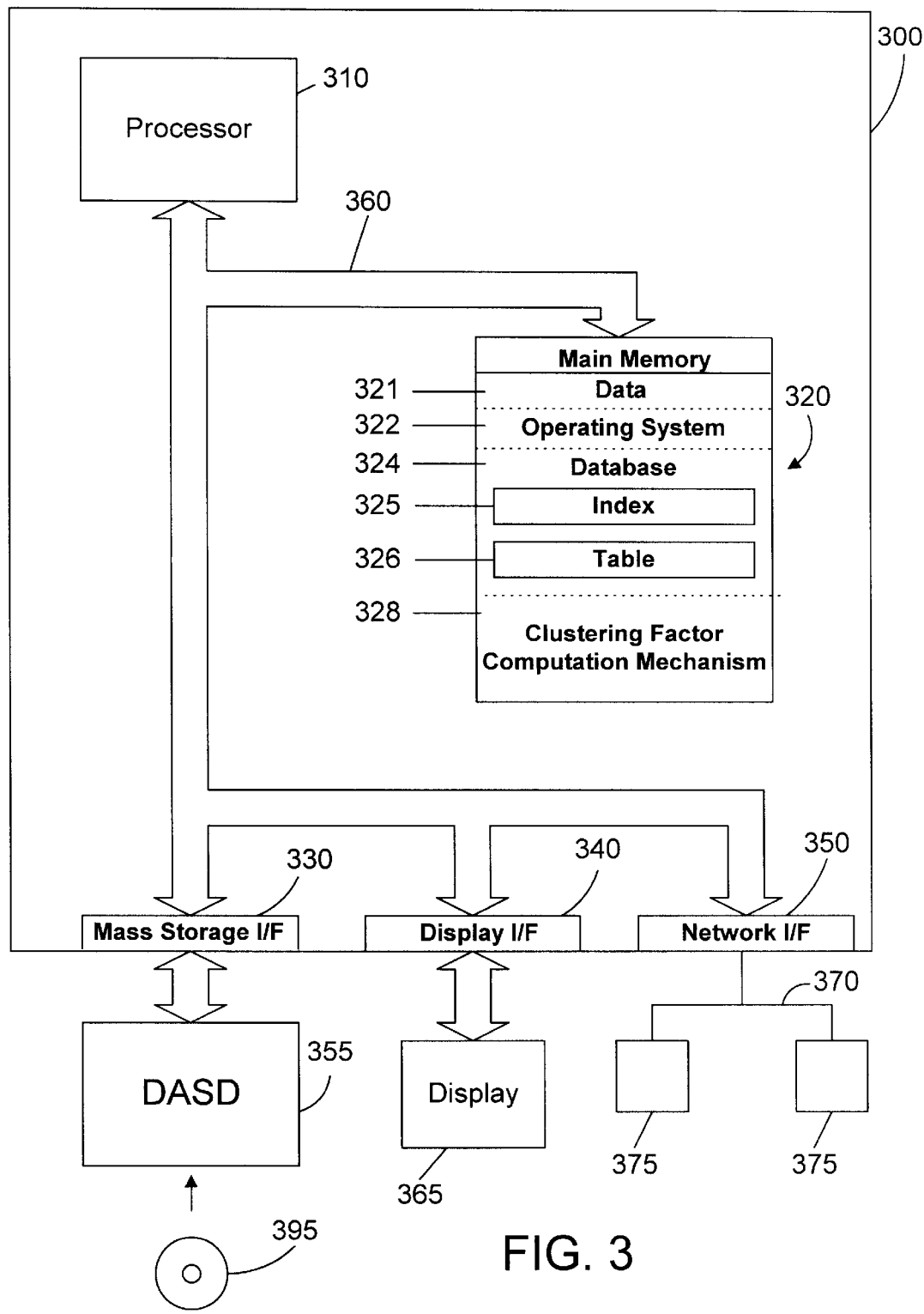
FIG. 3 is a block diagram of an apparatus in accordance with the preferred embodiments.

Referring now to FIG. 3, one specific implementation of a computer system in accordance with the preferred embodiments is an IBM iSeries 400 computer system 300 (which was previously known as the AS/400 computer system). Computer system 300 comprises a processor 310 connected to a main memory 320, a mass storage interface 330, a display interface 340, and a network interface 350. These system components are interconnected through the use of a system bus 360. Mass storage interface 330 is used to connect mass storage devices (such as a direct access storage device 355) to computer system 300. One specific type of direct access storage device is a read/write CDROM drive, which may store data to and read data from a CDROM 395.

Main memory 320 in accordance with the preferred embodiments contains data 321, an operating system 322, database 324, and a clustering factor computation mechanism 328. Computer system 300 utilizes well known virtual addressing mechanisms that allow the programs of computer system 300 to behave as if they only have access to a large, single storage entity instead of access to multiple, smaller storage entities such as main memory 320 and DASD device 355. Therefore, while data 321, operating system 322, database 324, and clustering factor computation mechanism 328 are shown to reside in main memory 320, those skilled in the art will recognize that these items are not necessarily all completely contained in main memory 320 at the same time. It should also be noted that the term "memory" is used herein to generically refer to the entire address space (i.e., virtual memory) of computer system 300.

Data 321 represents any data that serves as input to or output from any program in computer system 300. Operating system 322 is a multitasking operating system known in the industry as OS/400; however, those skilled in the art will appreciate that the spirit and scope of the present invention is not limited to any one operating system.

Processor 310 may be constructed from one or more microprocessors and/or integrated circuits. Processor 310 executes program instructions stored in main memory 320. Main memory 320 stores programs and data that processor 310 may access. When computer system 300 starts up, processor 310 initially executes the program instructions that make up operating system 322. Operating system 322 is a sophisticated program that manages the resources of computer system 300. Some of these resources are processor 310, main memory 320, mass storage interface 330, display interface 340, network interface 350, and system bus 360.

Database 324 includes a table 326 and an index 325 for data in table 326. While only one table and one index are shown in FIG. 3, one skilled in the art will recognize that a database such as database 324 can contain multiple tables 326 and multiple indexes 325.

Clustering factor computation mechanism 328 accesses information in the database table 326 to determine how closely the order in a database column correlates to the ordering of the underlying data in physical storage. Clustering factor computation mechanism 328 preferably computes clustering factor over a selected range, and is normalized to a range of zero to 100 percent. A high clustering factor indicates that data in the underlying physical storage is relatively ordered with respect to the database column, which results in better I/O performance from the memory paging system. A low clustering factor indicates that the data in the underlying physical storage is relatively unordered with respect to the database column, which results in degraded I/O performance from the memory paging system because more page swaps will be required when searching on an index with a low clustering factor.

Although computer system 300 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 310. However, those skilled in the art will appreciate that the present invention applies equally to computer systems that simply use I/O adapters to perform similar functions.

Display interface 340 is used to directly connect one or more displays 365 to computer system 300. Display 365 may be simple display devices or fully programmable workstations, and are used to allow system administrators to communicate with computer system 300.

Network interface 350 allows computer system 300 to send and receive data to and from any network 370 to which the computer system may be connected, to communicate with one or more computer systems 375 that are coupled to the network 370. Network 370 may be a local area network (LAN), a wide area network (WAN), the Internet, an Intranet, or any combination of these. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as CDROM (e.g., 395 of FIG. 3) and floppy disks, and transmission type media such as digital and analog communications links.

Figure 4:
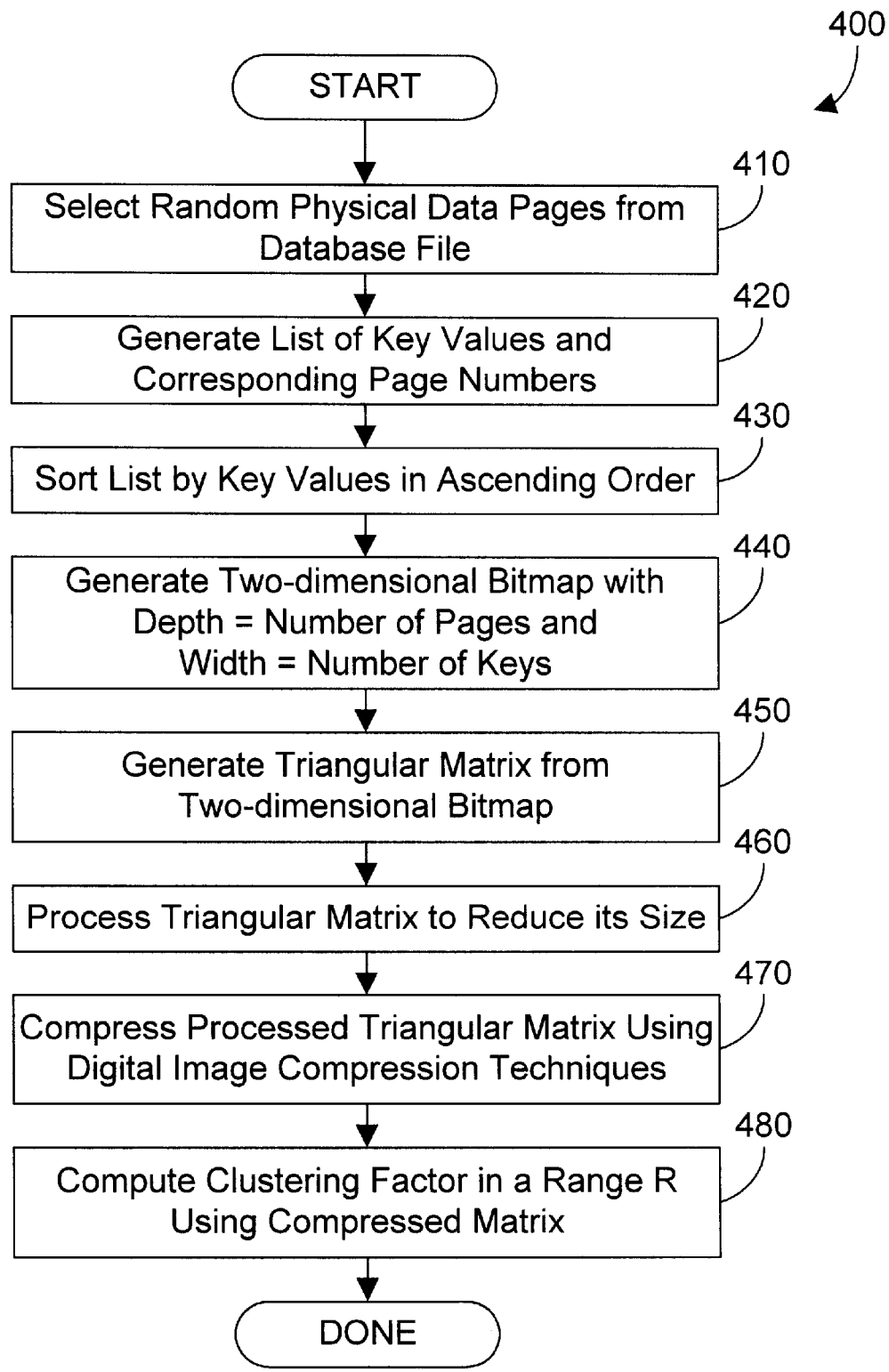
FIG. 4 is a flow diagram of a method for determining clustering factor distribution in accordance with the preferred embodiments.

Referring now to FIG. 4, a method 400 in accordance with the preferred embodiments begins by random selection of blocks from a database (step 410). These blocks may correspond to an existing index, or may be blocks based on a column in the database to estimate the performance of a potential index on that column. Note that block level sampling is currently done in the prior art in many database systems to collect different performance statistics. However, the clustering factor has not been computed or derived from block level sampling in the past. The present invention recognizes that block level sampling is already being performed to derive performance statistics for the database, so we can use the block level sampling information to derive clustering factor without requiring a different sampling. In other words, the present invention recognizes that block level sampling is already being performed for other reasons, so this information is readily available at very little cost in performance. In the preferred embodiments, step 410 is the prior art step of block level sampling that is currently done to collect other database performance statistics (other than clustering factor) because this information is already available and thus does not require additional samples. Note, however, that the present invention expressly extends to performing block level sampling that is separate from the block level sampling that is performed to collect database performance statistics known in the art. In addition, by performing block-level sampling, performance estimates based on clustering factor can be made based on a sample of the data, rather than performing a full scan on an entire index.

Once the blocks (e.g., pages) of physical data have been selected in step 410, a list of key values and corresponding page numbers is generated (step 420). This list is then sorted by key values in ascending order (step 430). The sorted list is then used to generate a two-dimensional bitmap that has a depth equal to the number of pages in the sample and that has a width equal to the number of keys in the index (step 440). Once the bitmap is generated, it is processed to generate a triangular matrix (step 450). The triangular matrix is then processed to reduce its size (step 460). The size of the matrix can be further reduced using digital image compression techniques (step 470). Finally, the clustering factor in a specified range can be determined from the compressed matrix (step 480). Note that the specific steps shown in FIG. 4 are not required to practice the present invention herein, but illustrate one suitable combination of steps in accordance with the preferred embodiments. The preferred embodiments herein expressly extend to any specific sequence of steps that generate a matrix from sampled data, and that process the matrix to determine clustering factor for a specified range in a database. The details of method 400 in FIG. 4 are discussed with reference to the specific example provided below.

FIG. 5 represents five pages of physical storage, labeled P1–P5, that have been randomly sampled from a database table. Note that the sampled pages are pages that satisfy the predicate specified in a key in a selected database index. The pages in FIG. 5 could be selected using step 410 of FIG. 4. In the preferred embodiments, a selected percentage of pages are randomly selected (e.g., ten percent). Once the pages have been sampled, a list of key values and their corresponding page numbers are generated (step 420), and this list is sorted by key values in ascending order (step 430), resulting in the sorted list 600 shown in FIG. 6. Note that in generating list 600, all blank portions of a page are left out. Each key is in ascending order (K1–K13), and its corresponding page is indicated in list 600.

The ordered list 600 can now be used to generate a two-dimensional bitmap as described in step 440 of FIG. 4, with a depth equal to the number of pages and width equal to the number of keys. For the example in FIGS. 5 and 6, there are five pages and thirteen keys. Once the bitmap has been created, all its values are initialized to zero, and location [1,1] in the bitmap is then initialized to one, as shown by bitmap 700 in FIG. 7. A triangular matrix that has a depth equal to the number of keys and a width equal to the number of keys is then created, initialized to zero, and its first location [1,1] is initialized to one, as shown in matrix 800 in FIG. 8. While the shape of matrix 800 appears square, the data values in the matrix will be in a triangular pattern, and it is for this reason that the matrix 800 is referred to as a "triangular matrix."

Values in the matrix may now be generated from information in the list 600, information in the bitmap 700, and information in other entries in the matrix 800. The values in the matrix 800 may be generated using the following logic:

M is the number of keys in the sample
N is the number of pages in the sample
List[M] is an array of records that each contain Key Value and Page# (e.g., 600 of FIG. 6)
BitMap[N] [M] is a two dimensional bitmap (see 700 of FIG. 7)
Triangular_Matrix[M] [M] is a two dimensional array (see 800 of FIG. 8)

```
FOR J=2 to M
    BEGIN
        K=List[J].Page#
        FOR I=1 TO J DO
            BEGIN
                IF (BitMap[K][I]=0) THEN
                    BEGIN
                        BitMap[K][I]=1;
                        Triangular_Matrix[I][J]=Triangular_Matrix[I][J-1]+1;
                    END
                ELSE
                    Triangular_Matrix[I][J]=Triangular_Matrix[I][J-1];
            END
    END
```

Figure 21:
FIG. 21 is a block diagram of a triangular matrix that was generated from the triangular matrix of FIG. 20 in accordance with the preferred embodiments.

By running through the logic above, one can generate the resulting triangular matrix for the example in FIGS. 5–8, as shown in FIG. 21. However, there is a much easier, graphical method for generating the resulting triangular matrix of FIG. 21 without getting bogged down in the logic shown above.

First, the matrix 800 is aligned beneath the bitmap 700, as shown in FIGS. 7 and 8, so that column K1 in the bitmap 700 is aligned with column K1 in the matrix 800. Locations [1,1] of both the bitmap 700 (FIG. 7) and the triangular matrix 800 (FIG. 8) were initialized to one, which is the required processing for the first key K1. This is why the logic above starts with J=2. We start with the second row in the matrix K2, as shown by the arrow in FIG. 10. We next look at the list 600 of FIG. 6 to determine which page number corresponds to the key K2. We see from the list that page P2 corresponds to K2. For this reason, we look at the row in the bitmap that corresponds to P2, as shown by the arrow in FIG. 9. We now march across the row for P2 a number of entries that corresponds to the numerical order of the key in question. Because the key under consideration is the second key, we need only march across two locations in row P2. The logic is very simple. If a value in the page row of the bitmap is zero, the value is changed to one, and the value in the corresponding location in the row in FIG. 10 takes on the value above it, plus one. If a value in the page row of the bitmap is one, the value in the corresponding location in the row in FIG. 10 takes on the value above it. Using this method, we can easily generate the values in the triangular matrix from the information in the list 600 (FIG. 6), the bitmap 700, and the triangular matrix 800.

Using this graphical method described above for the specific example in FIGS. 9 and 10, the first value in the page row P2 is a zero, so the value is changed to a one, and the value in the corresponding location in the K2 row in FIG. 10 takes on the value above it (1) plus one, for a total of 2. In similar fashion, the second entry in the page row is a zero, is changed to a one, and the value in the corresponding column in the matrix takes on the value above it (0) plus one, for a total of 1. Note that we only process two locations in the page row of FIG. 9 because the key K2 in question is the second key.

We now consider the next key, K3, as shown by the arrow in FIG. 12. Referring to list 600 of FIG. 6, we find that K3 has a corresponding page number P5, as indicated by the arrow in FIG. 11. We now fill in row K3 in the triangular matrix 800. The first location (K1) in the P5 row is zero, so we change it to a one, and the value that goes in the K1 location of the K3 row in the matrix is one more than the value above it. The value above it is a 2, so the value 3 is placed in the first location of the K3 row as shown in FIG. 12. In like manner, the next two zeroes in the P5 row are changed to ones, with the corresponding locations in the triangular matrix being one greater than the values above them. The bitmap 700 and triangular matrix 800 shown in FIGS. 11 and 12 represent processing up to and including K3. Note that there are only three non-zero entries in row K3 of the matrix 800 because it is the third key in the list 600 (FIG. 6).

We now consider the next key, K4, as shown by the arrow in FIG. 14. Referring to list 600 of FIG. 6, we find that K4 has a corresponding page number P3, as indicated by the arrow in FIG. 13. We now fill in row K4 in the triangular matrix 800. The first location (K1) in the P3 row is zero, so we change it to a one, and the value that goes in the K1 location of the K4 row is one more than the value above it. The value above it is a 3, so the value 4 is placed in the first location of the K4 row as shown in FIG. 14. In like manner, the next three zeroes in the P3 row are changed to ones, with the corresponding locations in the triangular matrix being one greater than the values above them. The bitmap 700 and triangular matrix 800 shown in FIGS. 13 and 14 represent processing up to and including K4. Note that there are only four non-zero entries in row K4 because it is the fourth key in the list 600 (FIG. 6).

We next consider K5, as shown by the arrow in FIG. 16. Referring to list 600 of FIG. 6, we find that K5 has a corresponding page number P1, as indicated by the arrow in FIG. 15. We now fill in row K5 in the triangular matrix 800. The first location (K1) in the P1 row is one, so the value that goes in the K1 location of the K5 row is the same as the value above it. The value above it is a 4, so the value 4 is placed in the first location of the K5 row as shown in FIG. 16. The second location (K2) in the P1 row is a zero, so we change it to a one, and the value that goes in the K2 location of the K5 row is one more than the value above it. The value above it is a 3, so the value 4 is placed in the second location of the K5 row as shown in FIG. 16. In like manner, the next three zeroes in the P1 row are changed to ones, with the corresponding locations in the triangular matrix being one greater than the values above them. The bitmap 700 and triangular matrix 800 shown in FIGS. 15 and 16 represent processing up to and including K5. Note that there are only five non-zero entries in row K5 because it is the fifth key in the list 600 (FIG. 6).

Next we consider K6, as shown by the arrow in FIG. 18. Referring to list 600 of FIG. 6, we find that K6 has a corresponding page number P5, as indicated by the arrow in FIG. 17. We now fill in row K6 in the triangular matrix 800. The first three locations K1–K3 in the P5 row are all one, as shown in FIG. 15, so the value that goes in the K1–K3 locations of the K6 row are the same as the values above them. Locations K4–K6 in the P5 row are all zero (see FIG. 15), so we change these to ones, and the value that goes in locations K4–K6 of the K6 row is one more than the values above them. The bitmap 700 and triangular matrix 800 shown in FIGS. 17 and 18 represent processing up to and including K6. Note that there are only six non-zero entries in row K6 because it is the sixth key in the list 600 (FIG. 6).

Processing of rows K7–K13 proceeds in similar manner, with the resulting bitmap shown in FIG. 19 and the resulting triangular matrix shown in FIG. 20. Note that the triangular matrix of FIG. 20 now needs to be inverted, because the axes were swapped to align with the bitmap above it. For this reason, the axes of the matrix are changed, with the resulting triangular matrix as shown in FIG. 21.

Note that the example provided herein and discussed in FIGS. 5–21 is extremely simplified for the purpose of illustrating the concepts of the preferred embodiments. With only thirteen keys and five pages, we still end up with a very large (13×13) matrix. Ths size of the matrix is determined by the number of keys in the sample. If we sample N pages that contain M keys, we will have M(M−1)/2 entries in the triangular matrix. In a real-life application, the number of keys and number of pages can be quite large. As a result, the size of the resulting triangular matrix can become too large to allow storing all of the values in the matrix. For this reason, the preferred embodiments process the resulting triangular matrix to reduce its size, as shown in steps 460 and 470 of FIG. 4.

In the triangular matrix (such as shown in FIG. 21), we keep counts for selectivity that varies from (100/M)% to (100M/M)%. However, clustering ratio only need be considered when the index is selective enough (i.e., exceeds some threshold value, such as 12%). One way to reduce the size of the matrix is to delete entries for indexes that have too high selectivity to merit using the index for a query. For instance, we assume we have a query:

SELECT * FROM lineitem
WHERE 1_orderkey BETWEEN 1 AND 100000
AND 1_partkey BETWEEN 1 and 1000 where there are two indexes, one over 1_orderkey and another over 1_partkey. The selectivity of "1_orderkey between 1 and 100000" is 90% and the selectivity of "1_partkey between 1 and 1000" is 5%. In this case the optimizer in the database will pick the 1_partkey as an access path to the data regardless of index clustering. As a result, keeping clustering statistics only on indexes that satisfy selectivity margins is desirable. If the selectivity margins are (i*100/M)% to (100*j/M)%, where i<=j, then the number of entries in the matrix will be reduced to [j−i+1)(2M−(i+j))/2]. For example if the margins for selectivity are i=2% and j=30%, respectively, the number of entries is (0.2352M* *2+0.84M), and the size of the matrix is reduced by a factor of (0.2352M2+0.84M)/(0.5M2+ 0.5M), which is approximately 2.3. By screening the values in the triangular matrix according to the selectivity of the index in this specific example, the number of entries was reduced by a factor of 2.3, which means that the processed triangular matrix has less than 44% of its original entries.

Another way to reduce the number of entries in the triangular matrix is to eliminate the duplicate keys and keep two extreme keys. For example, if key5 to key9 have the same value (such as "Mary"), we will eliminate the rows and columns in the matrix that correspond to key6, key7 and key8, and keep the two extreme values key5 and key9. Because the list 600 in FIG. 6 is sorted, we simply buffer the value of the key until we see a new one, as illustrated by the logic below.

```
FOR i=1 TO M DO
    BEGIN
        IF (equal)
        {
            //Equal. So accumulate the count
            //Delete the corresponding Row and column to that key;
        }
        ELSE
        {
            //It is a new value. So flush the previous one
            //Swap the pointers so that the current one
            //becomes the previous one
        }
    END
```

The triangular matrix can be further reduced in size by partitioning the keys into quantiles. In other words, we can select a subset of the keys so that the distance between two consecutive pairs is equal. For example, if the remaining keys in the matrix are K1, K2, K3, . . . , K100, then we can select ten quantiles to reduce the matrix size by keeping the rows and columns of the corresponding quantiles such that K10, K20, K30, K40, K50, K60, K70, K80, K90 and K100 are the selected quantiles and the distance between two quantiles is 10 keys. As a result, the matrix size is reduced from 100 columns to 10 columns, a 90% reduction in the size of the matrix. This reduction method produces a matrix that is an approximation of the original matrix, and the more quantiles we select the more accurately the resulting matrix will approximate the original matrix. If we select enough quantiles to more accurately approximate the original matrix, the resulting matrix may still be too large.

An analysis of the original triangular matrix (e.g. in FIG. 21) and any of the resulting matrices that result from the reduction techniques above shows that each entry in the matrix is strongly correlated with its neighbors. In this sense, the matrix is similar to a digital image, which can be represented using a matrix in which each pixel in the image is mapped to a matrix entry. In digital images, each pixel is in correlation with its neighbors. The preferred embodiments thus can employ known techniques for compressing a digital image to compress the triangular matrix. There are numerous known techniques for compressing a digital image, including KLM, fast Fourier transform, discrete cosine transform, and singular value decomposition (SVD). For ease of implementation, we have selected SVD as an appropriate technique for compressing the triangular matrix. For general information and more details regarding SVD, the reader is referred to a reference in image processing or linear algebra.

SVD is a well-known technique for rewriting a matrix into a product of two orthogonal matrices and a diagonal matrix. If U and V are the two orthogonal matrices and S is the diagonal matrix of the SVD representation of the matrix A, then $$A = U S V^t \bullet \tag{1}$$

The columns of U are eigenvectors of $AA^t$ and the columns of V are eigenvectors of $A^tA$. The r singular values on the diagonals of S are square roots of the non-zero eigenvalues of both $AA^t$ and $A^tA$. These eigenvalues are arranged in descending order of magnitudes. If vectors ui are the columns of the matrix U and the vectors vi are the columns of the matrix V and if si represents the singular values of A then we have the relation shown in Equation (2).

$$A = \sum_{i=1}^{r} s_i u_i v_i^t, \text{ where } r \text{ is the rank of } A \tag{2}$$

One property of the SVD is that it can separate the most significant information from the least significant information in the matrix. The k largest singular values (and the corresponding eigenvectors) of the matrix A capture the most significant information in the matrix. One can still approximate the matrix by storing the k largest singular values and its corresponding eigenvectors (k<<r).

While maintaining k largest singular values and its corresponding eigenvectors, one can determine the number of distinct pages using the following logic.

```
N=Page size (Row#);
R=Number of rows that fall in the specified index range
Distinct_Pages=0;
FOR i=1 TO k DO
    BEGN
        ui'=Filter(ui,R);
        vi'=Filter(vi,R);
        Distinct_Pages=Distinct_Pages+si*ui'*vi';
    END
The clustering factor can then be determined from equation (3).
    Clustering factor = R/(N*Distinct_Pages)    (3)
```

Once the clustering factor for a first index range is determined, the clustering factor of the first index range can then be compared to the clustering factor of a second index or range to compare the relative efficiencies of doing database queries using the first index range compared with using the second index range. An appropriate index and range can then be selected for a database query based on the relative efficiencies, which will likely improve the performance of the query.

The preferred embodiments allow much more information that is available from the crude estimates of clustering factor provide in the prior art, as shown in FIG. 2. For example, because the preferred embodiments allow determining the clustering factor over a specified range of a selected index, the distribution of the clustering factor over the entire index can now be readily determined by the preferred embodiments. The distribution of the clustering factor allows decisions on which index range to use to be based on the anticipated range of the index that will be accessed. The clustering factor distribution in an index thus gives additional information not available in the prior art to further refine a decision of which index to use based on the expected range in the index.

Another advantage of the preferred embodiments is the ability to determine clustering factor and clustering factor distribution from block level samples that are already collected in most database systems, thereby minimizing the performance impact of determining the clustering factor and distribution because the samples are already present for the purpose of gathering other useful statistics in the database system. For example, distribution of data and estimates of the number of distinct values are statistics that are known in the art. In addition, because the clustering factor and clustering factor distribution are determined in the preferred embodiments without regard to an assumed page buffer size, the preferred embodiments succeed at determining clustering factor and clustering factor distribution in computer systems that have a single-level store as well as computer systems that have virtual memory systems (i.e., two-level stores).

The preferred embodiments disclosed herein thus provide an apparatus and method for determining clustering factor and clustering factor distribution in a specified range of a selected index. The clustering factor information can then be used by a database manager to select an appropriate index that will likely perform a database search more quickly than other indexes. In addition, the clustering factor for a column in a database can be determined to estimate the performance of an index on that column.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
    at least one processor;
    a memory coupled to the at least one processor;
    a database residing in the memory, the database including a database manager that manages queries to the database;
    a clustering factor computation mechanism residing in the memory and executed by the at least one processor, wherein the clustering factor computation mechanism performs block sampling of a plurality of random physical data pages from the database, generates at least one matrix from the information in the block sampling, and processes the at least one matrix to determine clustering factor for a specified range in the database;
    wherein the database manager estimates performance of a query to the database based on the clustering factor.

2. The apparatus of claim 1 wherein the database includes a plurality of indexes that each have at least one key and a reference to at least one corresponding record in the database that satisfies the key, and wherein the clustering factor computation mechanism determines the clustering factor for a first range in a first index and determines the clustering factor for a second range in a second index, wherein the database manager determines relative efficiencies of the first index compared to the second index by comparing the clustering factor of the first index with the clustering factor of the second index, the database manager selecting one of the first and second indexes for a query of the database based on relative efficiencies indicated by the respective clustering factors.

3. The apparatus of claim 2 wherein the database manager selects one of the first and second indexes for a query of the database based on relative efficiencies indicated by the respective clustering factors.

4. The apparatus of claim 1 wherein the clustering factor computation mechanism further determines the distribution of the clustering factor over different ranges of the database.

5. The apparatus of claim 1 wherein the clustering factor computation mechanism generates the at least one matrix from an ordered list of keys generated from the block sampling and pages corresponding to the keys.

6. The apparatus of claim 1 wherein the clustering factor computation mechanism reduces the size of the at least one matrix using at least one digital image compression technique.

7. The apparatus of claim 6 wherein the digital image compression technique comprises singular value decomposition.

8. An apparatus comprising:
    at least one processor;
    a memory coupled to the at least one processor;
    a database residing in the memory, the database including a plurality of indexes that each have at least one key and a reference to at least one corresponding record in the database that satisfies the key, the database further including a database manager that manages queries to the database;
    a clustering factor computation mechanism residing in the memory and executed by the at least one processor, wherein the clustering factor computation mechanism performs block sampling of a plurality of random physical data pages from a selected index in the database, generates an ordered list of keys from the block sampling with pages corresponding to the keys, generates a two-dimensional bitmap from the ordered list, processes the two-dimensional bitmap to generate at least one matrix, reduces the size of the at least one matrix using at least one digital image compression technique, and processes the reduced matrix to determine clustering factor for a specified range of the selected index, the clustering factor computation mechanism determining the clustering factor for a first range in a first index for the database and determining the clustering factor for a second range in a second index for the database;
    wherein the database manager determines relative efficiencies of the first index compared to the second index by comparing the clustering factor of the first index with the clustering factor of the second index, the database manager selecting one of the first and second indexes for a query of the database based on relative efficiencies indicated by the respective clustering factors.

9. A method for determining clustering factor for a specified range in a database, the method comprising the steps of:

(A) block sampling a plurality of random physical data pages from the specified range;

(B) generating at least one matrix from the information in the block sampling; and (C) processing the at least one matrix to determine clustering factor for the specified range of the database.

10. The method of claim 9 wherein the specified range in the database comprises at least a portion of an index for the database.

11. The method of claim 9 further comprising the step of determining the distribution of the clustering factor over different ranges of the database.

12. The method of claim 9 wherein step (B) comprises the steps of:

(B1) generating an ordered list of keys from the block sampling with pages corresponding to the keys;

(B2) generating a two-dimensional bitmap from the order list; and (B3) processing the two-dimensional bitmap to generate the at least one matrix.

13. The method of claim 9 further comprising the step of reducing the size of the at least one matrix using at least one digital image compression technique.

14. The method of claim 13 wherein the digital image compression technique comprises singular value decomposition.

15. The method of claim 9 wherein:

steps (A), (B) and (C) are performed a first time to determine clustering factor for a first index;

steps (A), (B) and (C) are performed a second time to determine clustering factor for a second index;

and further comprising the step of selecting based on the clustering factors of the first and second indexes one of the first and second indexes for a query of the database.

16. A method for determining clustering factor distribution for a plurality of ranges in a database, the method comprising the steps of:

(A) block sampling a plurality of random physical data pages from the database;

(B) generating an ordered list of keys from the block sampling with pages corresponding to the keys;

(C) generating a two-dimensional bitmap from the order list;

(D) processing the two-dimensional bitmap to generate at least one matrix;

(E) reducing the size of the at least one matrix using at least one digital image compression technique;

(F) processing the at least one matrix to determine clustering factor for a specified range in the database; and (G) repeating steps (A) through (F) to determine clustering factor for each of the plurality of ranges in the database.

17. A program product comprising:

(A) a clustering factor computation mechanism that performs block sampling of a plurality of random physical data pages in a database, generates at least one matrix from the information in the block sampling, and processes the at least one matrix to determine clustering factor for a specified range of the database; and (B) computer-readable signal bearing media bearing the clustering factor computation mechanism.

18. The program product of claim 17 wherein the signal bearing media comprises recordable media.

19. The program product of claim 17 wherein the signal bearing media comprises transmission media.

20. The program product of claim 17 wherein the clustering factor computation mechanism determines the clustering factor for a first range in a first index and determines the clustering factor for a second range in a second index, and determines relative efficiencies of the first index compared to the second index by comparing the clustering factor of the first index with the clustering factor of the second index.

21. The program product of claim 20 further comprising a database manager residing on the signal bearing media that selects one of the first and second indexes for a query of the database based on relative efficiencies indicated by the respective clustering factors.

22. The program product of claim 17 wherein the clustering factor computation mechanism further determines the distribution of the clustering factor over different ranges of the database.

23. The program product of claim 17 wherein the clustering factor computation mechanism generates the at least one matrix from an ordered list of keys generated from the block sampling and pages corresponding to the keys.

24. The program product of claim 17 wherein the clustering factor computation mechanism reduces the size of the at least one matrix using at least one digital image compression technique.

25. The program product of claim 24 wherein the digital image compression technique comprises singular value decomposition.

26. A program product comprising:

(A) a database comprising:

(A1) a clustering factor computation mechanism that performs block sampling of a plurality of random physical data pages from a selected index in a database, generates an ordered list of keys from the block sampling with pages corresponding to the keys, generates a two-dimensional bitmap from the ordered list, processes the two-dimensional bitmap to generate at least one matrix, reduces the size of the at least one matrix using at least one digital image compression technique, and processes the reduced matrix to determine clustering factor for a specified range of the selected index, the clustering factor computation mechanism determining the clustering factor for a first range in a first index for the database and determining the clustering factor for a second range in a second index for the database;

(A2) a database manager that determines relative efficiencies of the first index compared to the second index by comparing the clustering factor of the first index with the clustering factor of the second index, the database manager selecting one of the first and second indexes for a query of the database based on the relative efficiencies indicated by the respective clustering factors; and (B) computer-readable signal bearing media bearing the database.

27. The program product of claim 26 wherein the signal bearing media comprises recordable media.

28. The program product of claim 26 wherein the signal bearing media comprises transmission media.

* * * * *